(12) United States Patent
Albou

(10) Patent No.: US 6,334,702 B1
(45) Date of Patent: *Jan. 1, 2002

(54) HEADLIGHT WITH FIXED AND MOVEABLE COAXIAL REFLECTORS FOR PRODUCING A VARIABLE BEAM

(75) Inventor: Pierre Albou, Paris (FR)

(73) Assignee: Valeo Vision (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/284,213

(22) PCT Filed: Aug. 7, 1998

(86) PCT No.: PCT/FR98/01774

§ 371 Date: Apr. 8, 1999

§ 102(e) Date: Apr. 8, 1999

(87) PCT Pub. No.: WO99/08041

PCT Pub. Date: Feb. 18, 1999

(30) Foreign Application Priority Data

Aug. 11, 1997 (FR) .............................. 97 10308

(51) Int. Cl.⁷ ................................ F21V 7/00
(52) U.S. Cl. .................. 362/514; 362/487; 362/465; 362/507; 362/516
(58) Field of Search ............................... 362/459, 487, 362/506, 507, 512, 513, 514, 515, 516, 517, 523, 526, 538, 539, 277, 465, 464, 466, 469, 467, 468

(56) References Cited

U.S. PATENT DOCUMENTS

| | | | | |
|---|---|---|---|---|
| 1,512,158 A | * | 10/1924 | Bragg et al. | 362/286 |
| 4,831,506 A | | 5/1989 | Miyazawa | |
| 4,857,794 A | * | 8/1989 | Watanabe | 313/113 |
| 4,951,178 A | * | 8/1990 | Shirai et al. | 362/512 |
| 5,060,120 A | * | 10/1991 | Kobayashi et al. | 362/365 |
| 5,178,452 A | * | 1/1993 | Scholz | 362/319 |
| 5,438,486 A | * | 8/1995 | McNair | 362/512 |

FOREIGN PATENT DOCUMENTS

| | | |
|---|---|---|
| FR | 2 727 497 | 5/1996 |
| WO | 96 27102 | 9/1996 |

* cited by examiner

*Primary Examiner*—Sandra O'Shea
*Assistant Examiner*—Ismael Negron
(74) *Attorney, Agent, or Firm*—Morgan & Finnegan, LLP

(57) ABSTRACT

A motor vehicle headlight includes a first, generally concave, reflector and a lamp mounted in the first reflector, the lamp connectable to a light source. A second reflector is housed within the concavity of the first reflector. The second reflector is moveable between a first position, wherein the headlight reflects a wide beam, and a second position, wherein the headlight reflects a narrow beam. The second reflector may be in communication with a device responsive to the speed of the vehicle in which the headlight is mounted, and accordingly, the position of the second reflector may be based on the speed of the vehicle.

9 Claims, 3 Drawing Sheets

Figure 1:
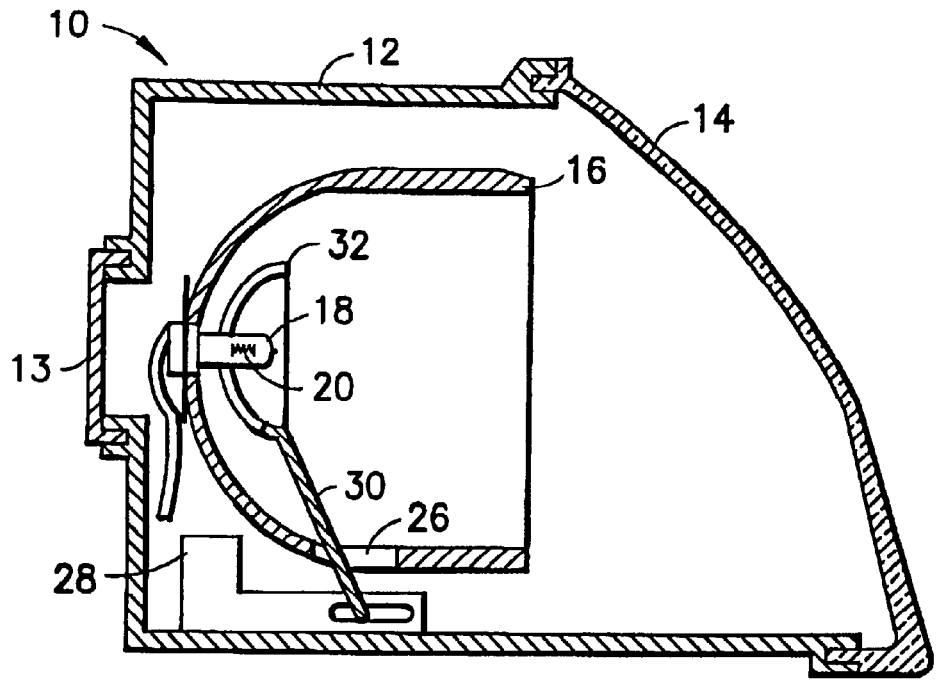

HEADLIGHT WITH FIXED AND MOVEABLE COAXIAL REFLECTORS FOR PRODUCING A VARIABLE BEAM

The present invention relates to variable-beam headlights for vehicles.

It concerns more particularly headlights which are capable of generating, by means of a single light source, beams of the main-beam type with different light distributions.

Headlights of this type have already been proposed, notably in the French patent application published under the No 2 727 497. The main advantage of such headlights is that the light distribution which they generate is adapted to the vehicle driving conditions. In general, the light distribution varies with the speed of the vehicle, in order to illuminate the areas close to the vehicle at low speed (broad beam) and to favour illumination of the road as far away as possible at high speed (narrow beam).

One object of the present invention is to provide a headlight of the aforementioned type with good optical performance and robust operation.

For this purpose, the invention proposes a headlight, notably for a vehicle, having a first, generally concave, reflector, a lamp mounted fixedly in the first reflector and carrying a light source, and a second reflector received in the concavity of the first reflector, in which the second reflector is able to move between an extreme position in which the headlight generates a broad beam and an extreme position in which the headlight generates a narrow beam.

The invention also proposes the following characteristics:
- the first reflector has at least one bearing area which receives the light from the light source when the second reflector is in one of the extreme positions, and which is masked by the second reflector when the latter is in the other extreme position;
- the second reflector generates a broad beam in one of the extreme positions and a narrow beam in the other extreme position;
- the first reflector has a base area which receives light from the light source whatever the position of the second reflector, and which reflects the light in a broad beam;
- the second reflector is able to move between an advanced extreme position, in which it generates a narrow beam, and a retracted extreme position, in which it generates a broad beam and masks at least one bearing area of the second reflector;
- the second reflector is mounted on a rod-shaped support which passes through an opening in the first reflector and which is connected to a drive device;
- the second reflector is produced in two parts joined by the support;
- the illumination along the optical axis in narrow beam is greater than the illumination along the optical axis in broad beam and the illumination at 101° azimuth in narrow beam is less than the illumination at 10° azimuth in broad beam;
- the illumination along the optical axis in narrow beam is greater than the illumination along the optical axis in broad beam and the illumination at 15° azimuth in narrow beam is less than the illumination at 15° azimuth in broad beam.

Figure 2:
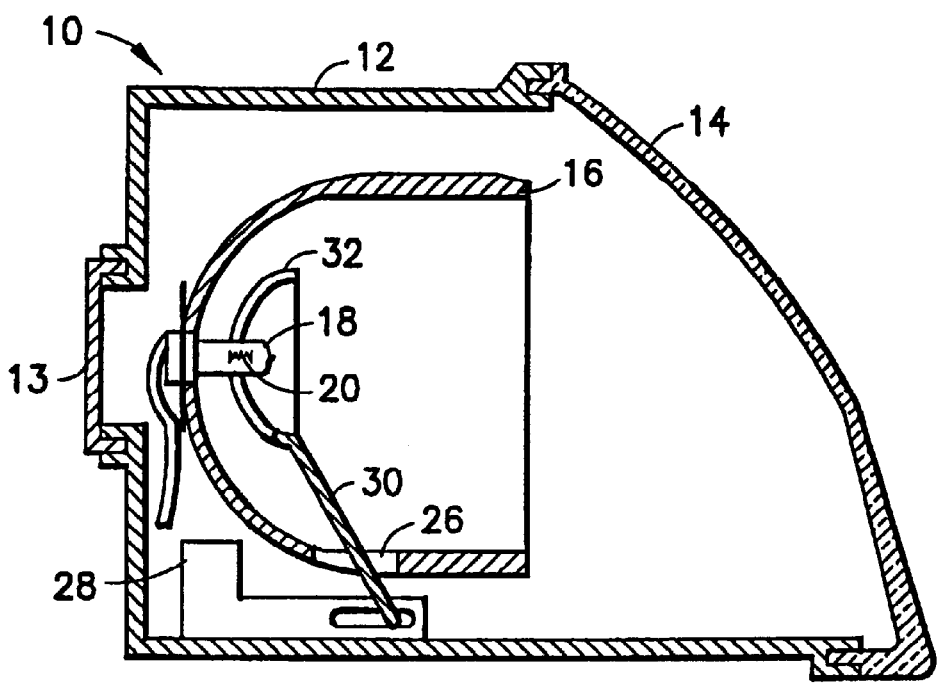
Figure 3:
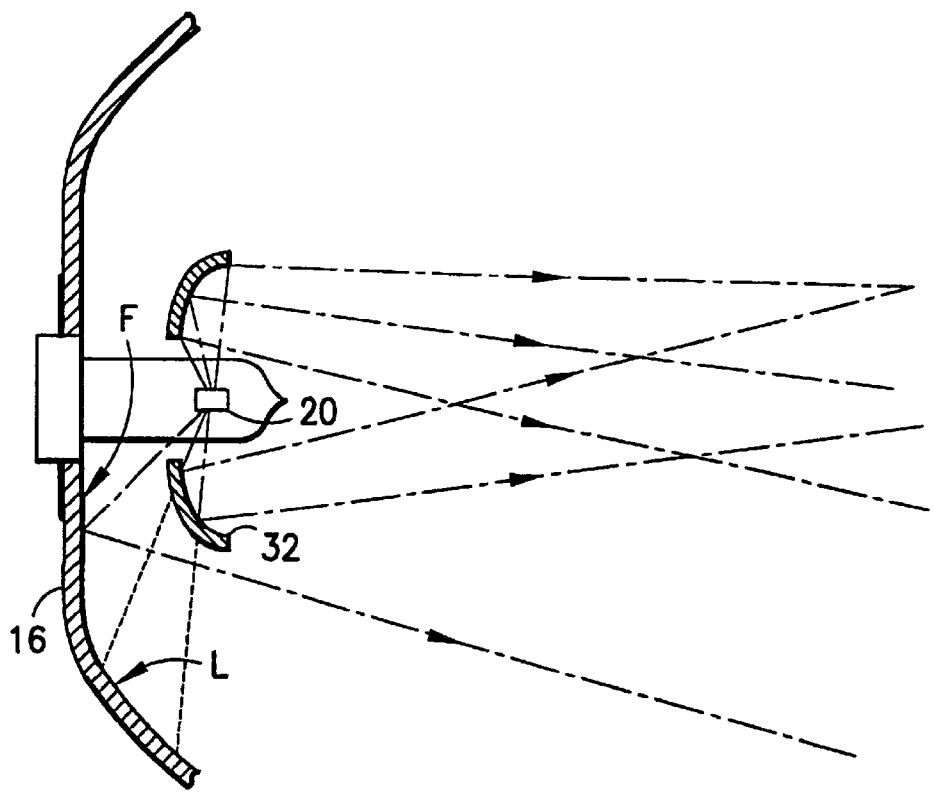
Figure 4:
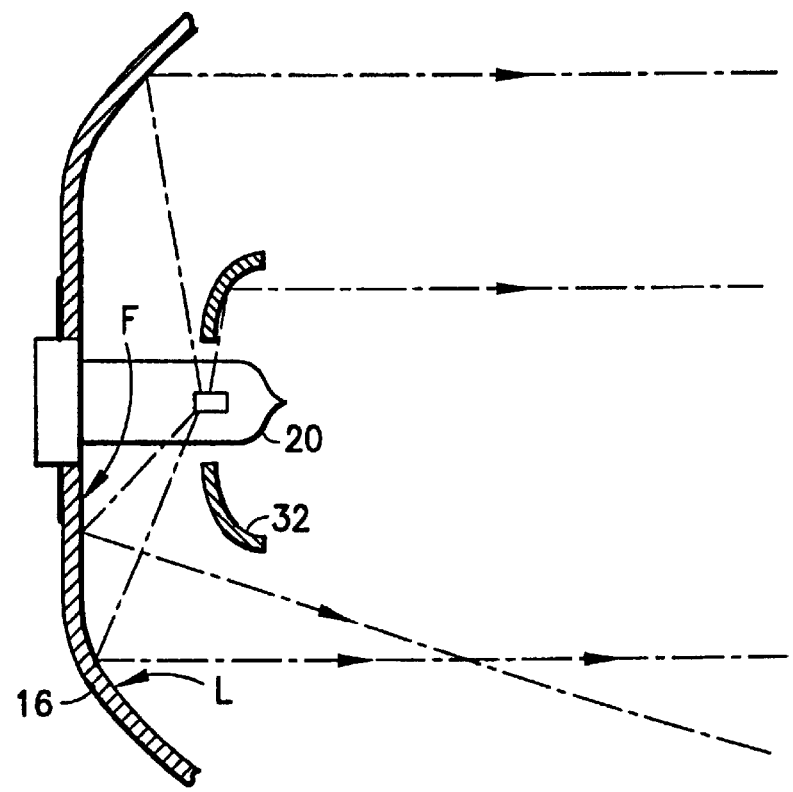
Figure 5:
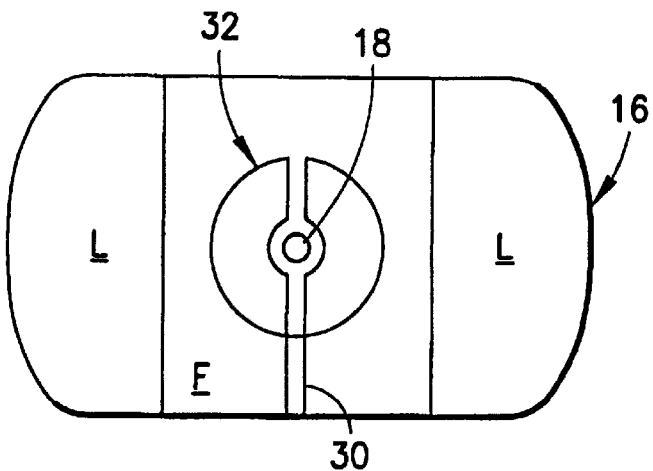
Figure 6:
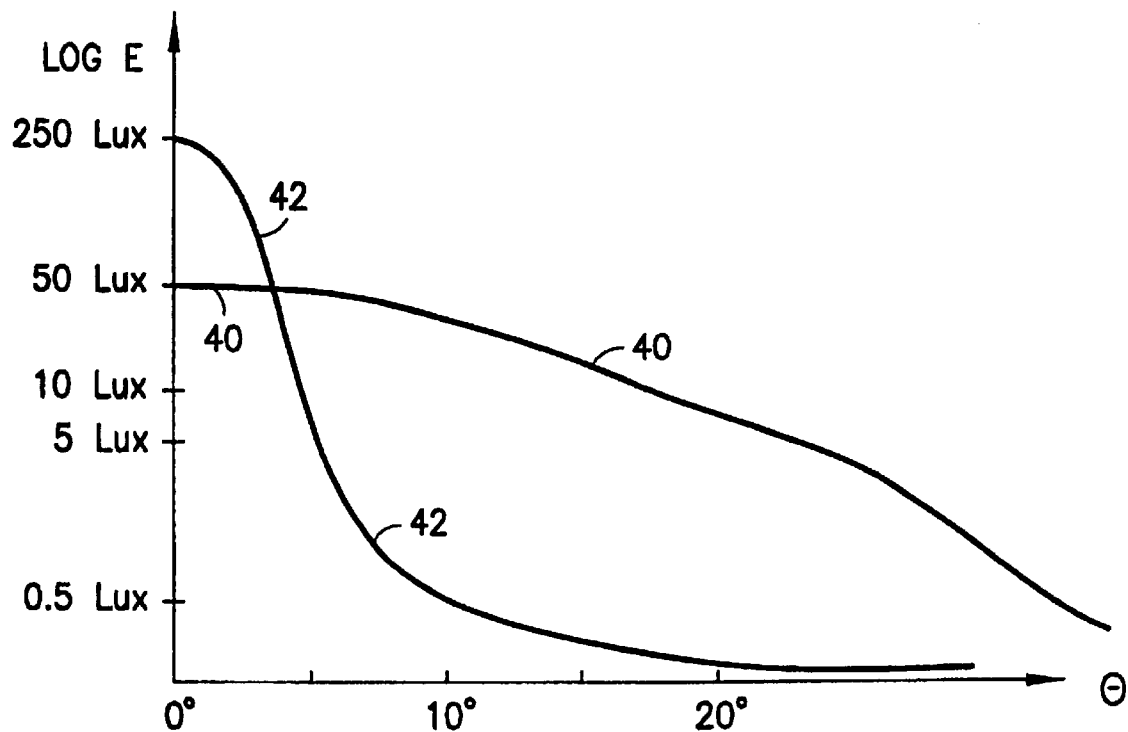

The invention will now be described with reference to the accompanying drawings, in which:

FIGS. 1 and 2 depict a headlight according to the invention in section through a vertical plane, FIGS. 3 and 4 depict part of the headlight according to the invention in horizontal section, FIG. 5 depicts the reflectors and lamp of the headlight according to the invention, in front view, FIG. 6 depicts the illumination generated by the headlight in two positions of the second reflector according to the azimuth.

The headlight produced in accordance with the teachings of the invention is referenced 10 overall in the accompanying drawings.

It has a housing 12 closed at the front by a transparent glass 14. The housing 12 receives a first reflector 16 of concave shape overall, the concavity being turned towards the glass 14 and thus defining an optical axis (the general direction of output of the light). In its region furthest away from the glass 14, the first reflector 16 receives a lamp 18 which carries a light source 20. The housing has, in its rear wall, an opening for access to the lamp 18 in order to replace it; in operation, this opening is closed by a cap 13.

The headlight 10 also has a second reflector 32 received in the concavity of the first reflector 16, close to the lamp 18. This second reflector 32 is of a size appreciably less than the first reflector 16. It is roughly concave in shape and approximately centred on the optical axis. The respective concavities of the first reflector 16 and second reflector 32 are turned roughly in the same direction (which corresponds to the optical axis of the headlight).

The second reflector 32 is mounted fixedly on a support 30, such as a rod. The support 30, for its part, is movable in translation along the optical axis with respect to the first reflector 16. The second reflector 32 is thus movable in translation in the first reflector 16.

In the embodiment depicted in FIGS. 1 and 2, the rod-shaped support 30 is fixed at one of its ends to the second reflector 32 and extends in a vertical plane through an opening 26 formed in the first reflector 16. The other end of the rod 30 is guided in translation in a drive device 28. The drive device 28 can for example have an electric motor and a system for converting the rotary movement into a movement driving the rod 30 in translation.

The drive device 28 is controlled by an electronic circuit which responds to the speed of the vehicle.

The assembly consisting of the first reflector 16, the second reflector 32, the support 30 and the drive device 28 can be mounted on a plate, itself mounted in the housing 12 by known means which enable the headlight 10 to be adjusted for elevation and azimuth.

The second reflector 32 is movable between two extreme positions: a so-called retracted position, furthest to the rear on the optical axis and closest to the area where the lamp 18 is fixed to the first reflector 16; and a so-called advanced position, the furthest forward on the optical axis, that is to say closest to the glass 14.

In the retracted position of the second reflector 32, depicted in FIGS. 1 and 3, the headlight generates a broad beam, particularly adapted to driving on a winding road or at low speed. This position of the second reflector 32 will therefore be used when the vehicle is travelling at low speed.

In the advanced position of the second reflector 32, depicted in FIGS. 2 and 4, the headlight generates a narrow beam, particularly adapted to driving on a straight road at high speed. This position of the second reflector 32 will therefore be used when the vehicle is travelling at high speed.

In addition, the second reflector 32 can be disposed in a continuous fashion over all the intermediate positions between the aforementioned two extreme positions, for example according to a monotonic function of the speed.

FIG. 6 depicts the illumination generated by the headlight in broad beam (curve referenced 40) and in narrow beam (curve referenced 42) according to the angular difference θ (azimuth angle) with respect to the optical axis, in the horizontal plane containing the optical axis. The illumination is measured in lux on a screen placed at 25 metres and is depicted on a logarithmic scale.

The illumination at 25 metres in the axis is for example 250 lux in narrow beam whilst it is 50 lux in broad beam.

For a difference of 10° with the optical axis (the azimuth angle), the illumination at 25 metres will be less than 2 lux in narrow beam whilst it would be greater than 10 lux in broad beam.

It can therefore be seen that, when changing from narrow beam to broad beam, the illumination in the axis increases whilst the illumination at 10° (azimuth angle) increases; the illumination of 15° increases also when passing from narrow beam to broad beam.

In order to generate the beams mentioned above, the first and second reflectors are constructed as described below.

The first reflector 16 has a base area F and at least one lateral area L, as can be seen clearly in FIG. 5. The first reflector 16 depicted in the accompanying drawings has precisely two lateral areas L.

The image of the light source 20 generated by the base area F is an angularly broad beam. The surface of the base area F generating such an angular spread is for example of the type described in the patent application published under the No 2 722 270. In order to define the base surface, this patent application can therefore be used as a basis when considering the second reflector 32 in its retracted position. The rays reflected by the base area F will then be as little intercepted by the second reflector 32 in the other positions thereof. Thus the base area F reflects the light in a broad beam which is little intercepted by the second reflector 32.

Moreover, the rays issuing from the light source 20 reach the base area F without ever being intercepted by the second reflector 32, whatever the position of the latter. This characteristic also defines the extent of the base area F.

The lateral areas L generate a beam which is very little spread angularly (narrow beam). It can be considered that the angular spread of a narrow beam is less than 10° on each side of the optical axis. These lateral areas L therefore constitute bearing areas. A parabolic optical surface whose focus is situated on the light source will therefore be suitable in the lateral areas L.

Advantageously, the lateral areas L are inactive in the retracted position of the second reflector 32. For this purpose, in its retracted position, the second reflector 32 is situated between the light source 20 and the lateral areas L of the first reflector 16. Thus, in its retracted position, the second reflector 32 masks the bearing areas (lateral areas) and recovers the light flux which was directed towards these bearing areas (see FIG. 3).

In the embodiment depicted in the accompanying figures, the second reflector 32 is produced in two parts connected by the support 30 and each placed on one side of the lamp 18 horizontally to the latter.

The optical surface defined by the second reflector 32 is such that it reflects a broad beam in the retracted position of the second reflector 32 (FIG. 3) and a narrow beam in the advanced position.

More precisely, and as can be seen clearly in FIG. 3, when the second reflector 32 is in the retracted position, the rays reflected by its regions close to the lamp 18 in horizontal section are highly divergent with respect to the optical axis whilst the rays reflected by its peripheral regions are almost parallel to the optical axis. In this way a broad beam is produced.

In the advanced position of the second reflector 32, all the rays reflected by the second reflector 32 are substantially parallel to the optical axis.

The surface given above by way of example has the required optical properties. This surface will be explained in a direct orthonormal reference frame (O,x,y,z). The origin O of this reference frame is situated at the centre of the light source 20; (O,y) is the optical axis of the headlight and (O,z) is vertical. The two extreme positions of the second reflector 32 are referenced on (O,y) by y1 and y2 (y1<y2).

A parameter $d_{max}$ and a decreasing function d: [y1, y2]→[$-d_{max}$, 0], which make it possible to adapt the distribution of the light in the beam, are chosen.

The function ρ is then determined (for example by conventional numerical methods) on [y1, y2] such that:

$$\frac{d\rho}{dy}(y) \cdot \left\{ \frac{p(y)}{\sqrt{y^2 + \rho^2(y)}} - \sin[d(y)] \right\} = \cos[d(y)] - \frac{y}{\sqrt{y^2 + \rho^2(y)}}.$$

The condition at the limits to be imposed for completely determining the function ρ determines the radius ρ0 of the base hole of the second reflector 32 and is written ρ0=ρ(y1).

It is often desirable for the beam not to have symmetry of revolution, but to be broader in its horizontal extension. Then a direction $A^\rho$ is chosen orthogonal to the optical axis in which there will be a spread $y_F$ or a contraction F1. For any θ lying between 2π, there is defined:

$$M(y, \theta) = \begin{pmatrix} \rho(y) \cdot \cos(\theta) \\ y \\ \rho(y) \cdot \cos(\theta) \end{pmatrix} \text{ and}$$

$$\overset{\rho}{r}(y, \theta) = \begin{pmatrix} \sin[d(y)] \cdot \cos(\theta) \\ \cos[d(y)] \\ \sin[d(y)] \cdot \sin(\theta) \end{pmatrix}.$$

Let also $\overset{\rho}{C} = \begin{pmatrix} 0 \\ y_F - F1 \\ 0 \end{pmatrix}$.

If, for each y and for each θ, the point $F_{22}(y,\theta)$ is the solution of the following equation:

$$\begin{cases} O\overset{\rho}{F}_{22} \cdot \overset{\rho}{y} = y_F \\ O\overset{\rho}{F}_{22} \cdot (\overset{\rho}{A} \wedge \overset{\rho}{r}) = \overset{\rho}{C} \cdot (\overset{\rho}{A} \wedge \overset{\rho}{r}) \\ O\overset{\rho}{F}_{22} \cdot [\overset{\rho}{r} \wedge (\overset{\rho}{A} \wedge \overset{\rho}{y})] = O\overset{\rho}{M} \cdot [\overset{\rho}{r} \wedge (\overset{\rho}{A} \wedge \overset{\rho}{y})] \end{cases}$$

and if $F_{21}(y,\theta)$ is the point such that:

$$M\overset{\rho}{F}_{21} = (M\overset{\rho}{F}_{22} \cdot \overset{\rho}{r}) \cdot \overset{\rho}{r},$$

then the surface of the second reflector 32 is defined by the points M' such that:

$$O\overset{\rho}{M'} = \lambda \cdot O\overset{\rho}{M}$$

with l=OM+MF$_{21}$ and $$\lambda = \frac{1}{2} \cdot \frac{l^2 - \overset{\rho}{OF}_{22}^2}{\overset{\rho}{OM} \cdot l - \overset{\rho}{OF}_{22} \cdot \overset{\rho}{OM}}.$$

The particularly advantageous interaction of the first reflector 16 and the second reflector 32 will be noted.

This is because, when the second reflector 32 is in the advanced position (FIG. 4), it recovers a small part of the light, which it reflects substantially parallel to the optical axis. The base area F of the first reflector 16 generates a light background (a homogenous broad beam). A major part of the light is recovered by the lateral bearing areas L, which reflect it parallel to the optical axis. In this way a particularly satisfactory narrow beam is produced.

Conversely, when the second reflector 32 is in the retracted position (FIG. 3), a large part of the light flux is intercepted by the second reflector 32, which in this position generates a broad beam. The lateral bearing areas L are masked by the second reflector 32 and therefore do not participate in the formation of the beam. On the second reflector 16, only the base area F is optically active, which generates a broad beam. This way a homogenous broad beam is produced.

The invention is not limited to the above example, which constitutes only a preferred embodiment thereof.

What is claimed is:

1. A headlight for a vehicle having a first substantially concave reflector, a lamp mounted in the first reflector and including a light source, and a second reflector received in a concavity of the first reflector, wherein the second reflector is movable in translation along an optical axis of the first reflector between a first extreme position in which the headlight generates a broad beam and a second extreme position in which the headlight generates a narrow beam, the position of the second reflector based on a speed of the vehicle.

2. A headlight according to claim 1, wherein the first reflector has at least one bearing area for receiving a light beam from the light source when the second reflector is in one of the extreme positions, and which is masked by the second reflector when the latter is in the other extreme position.

3. A headlight according to one of claim 1 or 2, wherein the second reflector generates a broad beam in one of the extreme positions and a narrow beam in the other extreme position.

4. A headlight according to claim 1, wherein the first reflector has a base area which receives light from the light source whatever the position of the second reflector, and which reflects the light in a broad beam which is not intercepted by the second reflector.

5. A headlight according to claim 1, wherein the second reflector is able to move between an advanced extreme position, in which it generates a narrow beam, and a retracted extreme position, in which it generates a broad beam and masks at least one bearing area of the first reflector.

6. A headlight according to claim 1, wherein an illumination along an optical axis in narrow beam is greater than an illumination along the optical axis in broad beam and wherein an illumination at 10° azimuth in narrow beam is less than an illumination at 10° azimuth in broad beam.

7. A headlight according to claim 1, wherein an illumination along an optical axis in narrow beam is greater that an illumination along the optical axis in broad beam and wherein an illumination at 15° azimuth in narrow beam is less than an illumination at 15° azimuth in broad beam.

8. A headlight according to claim 1, wherein the second reflector is mounted on a rod-shaped support which passes through an opening in the first reflector and is connectable to a drive device.

9. A headlight according to claim 8, wherein the second reflector is produced in at least two parts which are connectable by the support.

* * * * *